United States Patent [19]
Ogawa et al.

[11] Patent Number: 5,959,034
[45] Date of Patent: Sep. 28, 1999

[54] CURABLE SILICONE COMPOSITION

[75] Inventors: Masahiko Ogawa; Naoki Omura; Shunji Aoki, all of Gunma-ken, Japan

[73] Assignee: Shin-Etsu Chemical Co., Ltd., Tokyo, Japan

[21] Appl. No.: 09/061,263

[22] Filed: Apr. 17, 1998

[30] Foreign Application Priority Data

Apr. 18, 1997 [JP] Japan .................................. 9-116375

[51] Int. Cl.$^6$ ...................................................... C08F 8/00
[52] U.S. Cl. ........................... 525/104; 525/117; 525/446; 525/452; 528/15; 528/28; 528/31
[58] Field of Search ................................ 528/15, 28, 31; 525/104, 117, 446, 452

[56] References Cited

U.S. PATENT DOCUMENTS

| | | |
|---|---|---|
| 5,248,750 | 9/1993 | Takarada et al. .................... 528/15 |
| 5,306,737 | 4/1994 | Burkhart et al. .................... 521/112 |
| 5,565,194 | 10/1996 | Burkhart et al. .................... 424/70.12 |

*Primary Examiner*—Melvyn I. Marquis
*Assistant Examiner*—Mark W. Milstead
*Attorney, Agent, or Firm*—Millen, White, Zelano & Branigan, P.C.

[57] ABSTRACT

A curable silicone composition having high compatibility with organic polymers, which comprises (a) 100 parts by weight of a hydroxyl group-containing organopolysiloxane represented by the following formula (I) and (b) 1–50 parts by weight of an isocyanate compound having at least two isocyanate groups per molecule, wherein the number of the hydroxyl groups per molecule in the component (a) plus the number of the isocyanate groups per molecule in the component (b) is at least 5:

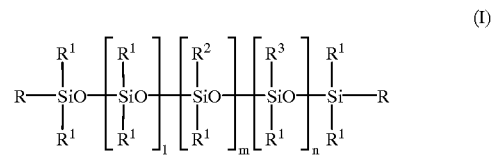

wherein $R^1$ is a monovalent saturated hydrocarbon group; $R^2$ is a phenyl-substituted alkyl group represented by $C_6H_5-(CH_2)_p-CH(R^4)-CH_2-$; $R^3$ is a hydroxyl-substituted alkyl group represented by $-CH_2-CH_2-CH_2-O-(C_2H_4O)_q-H$; two R groups are the same group or different groups selected from the groups represented by $R^1$, $R^2$ or $R^3$; $R^4$ is a hydrogen atom or the same group as $R_1$; l is 0 or a positive number, m is a positive number and n is a positive number of no less than 2, provided that $0.10 \leq m/(l+m+n) \leq 0.70$ and $5 \leq l+m+n \leq 100$; p is an integer of from 0 to 5; and q is an integer of from 1 to 3.

9 Claims, No Drawings

CURABLE SILICONE COMPOSITION

FIELD OF THE INVENTION

The present invention relates to a curable silicone composition which can confer excellent releasing and slipping properties on a substrate and, more particularly, to a curable silicone composition which can be used as an admixture with a dispersion or solution of organic polymer in an organic solvent.

BACKGROUND OF THE INVENTION

Hitherto, curable silicone compositions have been used for preventing an adhesive material from adhering or fixing to a substrate, such as paper or a plastic film, or as materials which can improve slipping properties between, e.g., paper and paper, paper and a plastic film, plastic films, a plastic substance and a hand, or a plastic substance and a metallic substance.

Usually, those silicone compositions are used in a state where they are each dissolved in an organic solvent or emulsified in water, as described, e.g., in Tokko Sho 35-13709, Tokko Sho 36-1397 and Tokko Sho 46-26798 (the term "Tokko" as used herein means an (examined Japanese patent publication). Each of the silicone compositions provided as organic solvent solutions contains a diorganopolysiloxane having a high molecular weight (a high degree of polymerization) as a main component, so that it is inevitable to use a great deal of organic solvent for dissolving the composition and, what is worse, the resulting solution has poor adhesion to a substrate.

On the other hand, aqueous emulsions of silicone compositions, though they are free from problems concerning the use of organic solvents, not only arise a fear for secondary environmental pollution because they require the use of emulsifiers, but also they have a disadvantage in cost because it takes a longer time at a high temperature to completely cure the coatings thereof.

With the intention of solving the problems as mentioned above, the solvent-free silicone compositions, or the silicone compositions containing neither water nor organic solvent, have been proposed in, e.g., Tokko Sho 53-18057, Tokko Sho 52-39791, Tokkai Sho 51-73054 and Tokkai Sho 50-141591 (the term "Tokkai" as used herein means an "unexamined published Japanese patent application"). However, those compositions have a drawback of forming hard and weak films because their main component is a vinylsiloxane or a hydrogensiloxane having a viscosity of from 50 to 5,000 cs (at 25° C.).

In contrast to the aforementioned methods wherein silicone compositions are applied by themselves to the substrate surfaces, there is a method of coating a substrate surface with a silicone composition-incorporated organic resin to confer releasing or slipping properties on the substrate surface. As the so-called incorporation type of release agent, petroleum wax-incorporated release agents, silicone-incorporated release agents or the mixtures thereof have been used so far. And most of the silicones incorporated in those release agents are non-reactive silicones. Thus, such agents have a defect that the non-reactive silicones show a migration phenomenon to cause gradual deterioration in characteristics, such as releasability, slippability and so on, and further to soil a material which comes in touch therewith.

SUMMARY OF THE INVENTION

Therefore, an object of the present invention is to provide a curable silicone composition which is suitable for incorporation with an organic polymer and can confer excellent releasing and slipping properties upon a substrate coated therewith and, what is more, which does not soil a material which comes in touch therewith, ensures high work efficiency and has excellent environmental adaptability.

The above-described object of the present invention is attained with a curable silicone composition which comprises (a) 100 parts by weight of an organopolysiloxane represented by the following formula (I) and (b) 1–50 parts by weight of an isocyanate compound having at least two isocyanate groups per molecule, wherein the number of the hydroxyl groups per molecule in the component (a) plus the number of the isocyanate groups per molecule in the component (b) is at least 5:

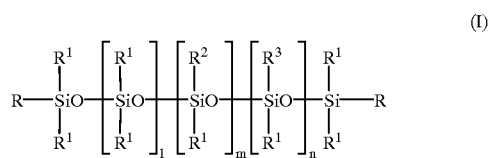

(I)

wherein $R^1$ is a monovalent saturated hydrocarbon group; $R^2$ is a phenyl-substituted alkyl group represented by $C_6H_5-(CH_2)_p-CH(R^4)-CH_2-$; $R^3$ is a hydroxyl-substituted alkyl group represented by $-CH_2-CH_2-CH_2-O-(C_2H_4O)_q-H$; two R groups are the same group or different groups selected from the groups represented by $R^1$, $R^2$ or $R^3$; $R^4$ is a hydrogen atom or the same group as $R^1$; l is 0 or a positive number, m is a positive number and n is a positive number of no less than 2, provided that $0.10 \leq m/(l+m+n) \leq 0.70$ and $5 \leq l+m+n \leq 100$; p is an integer of from 0 to 5; and q is an integer of from 1 to 3.

In accordance with embodiments of the present invention, the curable silicone composition defined above is admixed with an organic polymer, coated on the substrate surfaces of various kinds, and dried to form cured films. The cured films obtained have high heat resistance and excellent releasing and slipping properties, and don't soil the materials brought into contact therewith because the releasing component thereof causes no migration.

DETAILED DESCRIPTION OF THE INVENTION

The organopolysiloxane as the first component (Component (a)) of a curable silicone composition according to the present invention has at least two hydroxyl-substituted alkyl groups per molecule, and further contains phenyl-substituted alkyl groups in a proportion of from about 5 to about 30 mole % to the total organic groups in one molecule. In particular, it is desirable that the organopolysiloxane as Component (a) of the present invention be a linear organopolysiloxane represented by formula (II):

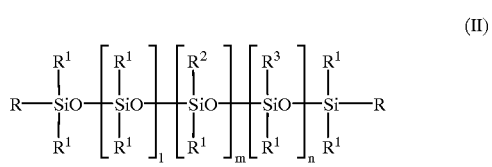

(II)

In the above formula, $R^1$ is a monovalent saturated hydrocarbon group such as a methyl or ethyl group, and particularly preferably a methyl group. $R^2$ is a phenyl-substituted alkyl group represented by $C_6H_5-(CH_2)_p-CH(R^4)-CH_2-$ (wherein p is an integer of from 0 to 5, and $R^4$ is a hydrogen atom or $R^1$). $R^3$ is a hydroxyl-substituted alkyl group represented by —$CH_2$—$CH_2$—$CH_2$—O—($C_2H_4O$)$_q$—H (wherein q is an integer of from 1 to 3), and at least two $R^3$ groups are required to be present in the organopolysiloxane as Component (a) (in other words, n≧2 in formula (II)). Further, the organopolysiloxane as Component (a) is required to have a degree of polymerization (l+m+n) of from 5 to 100, preferably from 10 to 50.

Besides being a straight chain, the molecular structure of this organopolysiloxane may be a branched chain so far as the object or the effects of the present invention, or the acquisition of characteristics as mentioned above, can be attained. The compatibility with an organic polymer and bleed-out properties can be controlled by adjusting the degree of polymerization and the proportion of $R^2$.

The isocyanate compound as the second component (Component (b)) of a curable silicone composition according to the present invention reacts with the hydroxyl groups of the foregoing polysiloxane as Component (a) to cross-link the polysiloxane molecules. The isocyanate compound as Component (b) is required to be a low molecular weight polyisocyanate compound having at least two isocyanate groups per molecule, but it has no other particular limitations. Examples of such a polyisocyanate compound include triphenylmethane triisocyanate, diphenylmethane diisocyanate, tolylene diisocyanate, hexamethylene diisocyanate and xylylene diisocyanate.

The amount of Component (b) mixed with Component (a) depends on the content of hydroxyl groups in the organopolysiloxane used as Component (a). In general, the Component (b) is used in the amount equivalent or slightly excess of that theoretically required for reaction with the hydroxyl groups, specifically ranging from 1 to 50 parts by weight per 100 parts by weight of the Component (a). The curable composition according to the present invention can be obtained by mixing the foregoing Components (a) and (b) in the respectively required amounts. In mixing them, an amine or organotin compound may be added thereto as a catalyst for accelerating the reaction, if desired.

Since the curable silicone composition according to the present invention utilizes an urethanation reaction, it can have good compatibilities with many organic polymers, particularly in a state of solution. Therefore, it is added to a solution of organic polymer, e.g., polyester, polyurethane, polyvinyl chloride, polyvinyl acetate or an alkyd resin, in organic solvent, and can be easily applied to various kinds of paper, such as polyethylene laminated paper and glassine paper, and films and moldings of plastics such as polyolefin and polyester.

In applying the foregoing solution to a flat substrate, a roll coater, a gravure coater, an air knife coater or the like can be used; while, when the solution is applied to a substrate having a three-dimensional form, known coating techniques, such as brush coating, spray coating, dip coating and the like, can be adopted. The thus applied solution is dried at ordinary temperature or by heating to undergo curing and form a cured film on the substrate surface.

The film thus formed has not only excellent adhesiveness to the substrate, compared with the film formed from a silicone composition alone, but also an advantage in that there is very low possibility of its being poorly cured, in contrast to addition type compositions. Further, the cured film obtained in accordance with the present invention is almost free from changes of characteristics which are generally caused in non-curable type release agents, and does not soil the material brought into contact therewith. Therefore, the present silicone composition can have increased application possibilities.

The present invention will now be illustrated in greater detail by reference to the following examples. However, the invention should not be construed as being limited to these examples. Additionally, unless otherwise noted in the following examples, all "parts" are by weight and the data on the viscosity are the values measured at 25° C.

The characteristics evaluation of cured films obtained in the following examples are made as follows:

Curability

A prescribed amount of composition is coated on the surface of a 50 μm-thick polyester film, and heated in an air circulation oven at a fixed temperature for the hours prescribed. The thus dried coating is rubbed with fingers, and thereby examined as to whether it comes off or not and becomes opaque or not. When neither coming-off nor opacifying phenomenon is observed, the curability is regarded as being very good (which is represented by the mark "⊚").

Releasability

A prescribed amount of composition is coated on the surface of a 38 μm-thick polyester film, and heated in an air circulation oven at a fixed temperature for the hours prescribed, thereby forming a cured coating. Then, a polyester tape (Nitto-31B, trade name, a product of Nitto Electric Industrial Co., Ltd.) is applied to the cured coating, and subjected to aging at 70° C. for 20 hours while imposing a load of 20 g/cm² thereon. Thereafter, the tape is peeled away from the coating under the condition that the peeling angle is 180° and the peeling speed is 0.3 m/min, and the force [g] required for peeling is measured.

Slippability

By the use of a prescribed amount of composition, a cured coating is formed on a substrate of sheet form in the same manner as in the foregoing releasability test. On the cured coating, styrene-butadiene rubber (SBR) loaded with a weight of 200 g is placed, and pulled in the direction parallel to the surface of the cured coating at a speed of 0.3 m/min. And the force [g] required for pulling out the rubber is measured, and multiplied by the factor of 1/200 to determine the coefficient of dynamic friction (according to ASTMD 1894-63). In addition, a hand is passed over the surface of the cured coating, and thereby the relative evaluation of slippability is made by the criterion described below:

⊚—very smoothly slip on the coating

O—smoothly slip on the coating

X—hard to slip on the coating

X X—not slip on the coating at all

SYNTHESIS EXAMPLE 1

In a 500 ml of four-necked flask equipped with a mechanical stirrer, a reflux condenser, a thermometer and a dropping funnel, 94.2 g of an organohydrogenpolysiloxane represented by the following formula (i), which was synthesized in a conventional manner, and 100 g of toluene were placed, and heated up to 90° C. with stirring.

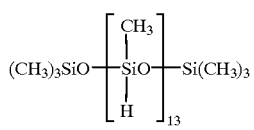
(i)

Thereto, the mixture of 82.6 g of α-methylstyrene with 2 mg of hydrogen hexachloroplatinate(IV) was added dropwise as the aforesaid heating and stirring operations were continued. After the dropwise addition was completed, the reaction was conducted therein at 110° C. over a period of 8 hours. Further thereto, the mixture of 67.3 g of allyl glycol with 2 mg of hydrogen hexachloroplatinate(IV) was added dropwise at 70° C., and underwent reaction over a period of 8 hours. The toluene and the starting materials remaining unreacted were distilled off under reduced pressure to obtain 220 g of a transparent Organopolysiloxane A represented by the following formula (ii).

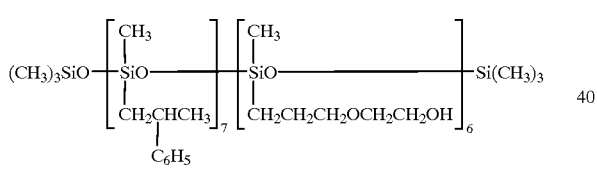
(ii)

The Organopolysiloxane A obtained had a viscosity of 2,430 cp, a refractive index of 1.497 and a hydroxyl value of 137 KOH mg/g. This hydroxyl value indicates that about 6 hydroxyl groups are present per molecule.

SYNTHESIS EXAMPLE 2

In a 500 ml four-necked flask provided with the same equipments as used in Synthesis Example 1, 98.8 g of an organohydrogenpolysiloxane represented by the following formula (iii), which was synthesized in a conventional manner, and 100 g of toluene were placed, and heated up to 90° C. with stirring.

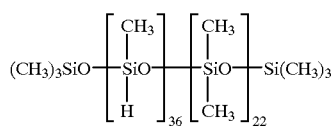
(iii)

Thereto, the mixture of 82.6 g of α-methylstyrene with 2 mg of hydrogen hexachloroplatinate(IV) was added dropwise as the aforesaid heating and stirring operations were continued. After the dropwise addition was completed, the reaction was conducted therein at 110° C. over a period of 8 hours. Further thereto, the mixture of 22.5 g of allyl glycol with 2 mg of hydrogen hexachloroplatinate(IV) was added dropwise at 70° C., and underwent reaction over a period of 8 hours. The toluene and the starting materials remaining unreacted were distilled off under reduced pressure to obtain 190 g of a transparent Organopolysiloxane B represented by the following formula (iv).

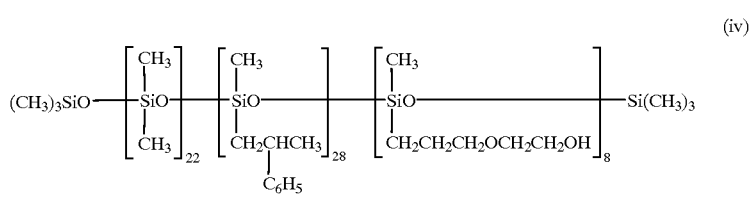
(iv)

The Organopolysiloxane B obtained had a viscosity of 4,830 cp, a refractive index of 1.493 and a hydroxyl value of 54 KOH mg/g. This hydroxyl value indicates that about 8 hydroxyl groups are present per molecule.

SYNTHESIS EXAMPLE 3

A transparent Organopolysiloxane C represented by the following formula (vi) was synthesized in a yield of 190 g in the same manner as in Synthesis Example 1, except that 99.1 g of an organohydrogenpolysiloxane represented by the following formula (v) was used in place of the organohydrogenpolysiloxane of formula (i) and the amount of α-methylstyrene used was reduced to half, namely 41.3 g.

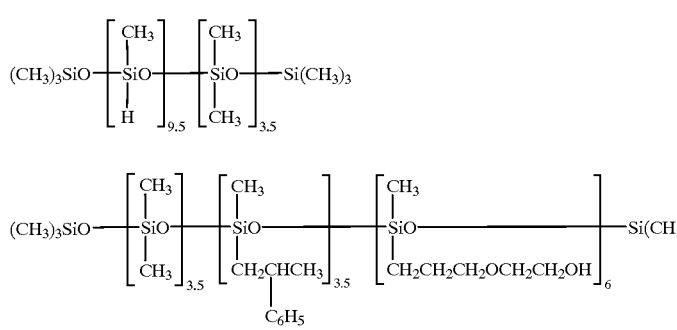

The Organopolysiloxane C obtained had a viscosity of 2,450 cp, a refractive index of 1.475 and a hydroxyl value of 139 KOH mg/g. This hydroxyl value indicates that about 6 hydroxyl groups are present per molecule.

EXAMPLE 1

The mixture of 100 parts of Organopolysiloxane A synthesized in Synthesis Example 1 with 20 parts of tolylene diisocyanate was added in an amount of 2 parts to 100 parts of a 20% dispersion of saturated polyester (Vylon 200, trade name, produced by Toyobo Co., Ltd.) in a toluene/methyl ethyl ketone (1:1) mixture. The solution obtained was coated on a 38 μm-thick polyester film using a doctor wire bar of #3, and the coated film was placed in a 120° C. air circulation oven for 60 seconds to undergo thermal curing. The thus cured coating was examined for releasability and slippability in accordance with the aforementioned methods respectively. Further, the same cured coating was formed in the same manner as described above, except that the thickness of the polyester film used was changed to 50 μm, and examined for curability in the aforementioned way. The evaluation results obtained are shown in Table 1. In addition, the surface properties of the polyester film used are also set forth in Table 1.

EXAMPLE 2

The mixture of 100 parts of organopolysiloxane B synthesized in Synthesis Example 2 with 10 parts of tolylene diisocyanate was added in an amount of 2 parts to 100 parts of a 20% dispersion of saturated polyester (Vylon 200, trade name, produced by Toyobo Co., Ltd.) in a toluene/methyl ethyl ketone (1:1) mixture. The solution obtained was coated on a 38 μm-thick polyester film using a doctor wire bar of #3, and the coated film was placed in a 120° C. air circulation oven for 60 seconds to undergo thermal curing. The thus cured coating was examined for releasability and slippability by the same methods as in Example 1. Further, the same cured coating was formed in the same manner as described above, except that the thickness of the polyester film used was changed to 50 μm, and examined for curability in the same way as in Example 1. The evaluation results obtained are also shown in Table 1.

EXAMPLE 3

The mixture of 100 parts of Organopolysiloxane C synthesized in Synthesis Example 3 with 15 parts of tolylene diisocyanate was added in an amount of 2 parts to 100 parts of a 20% dispersion of vinyl chloride-vinyl acetate copolymer (Esleck M, trade name, produced by Sekisui Chemical Co., Ltd.) in a toluene/methyl ethyl ketone (1:1) mixture. The solution obtained was coated on a 38 μm-thick polyester film using of a doctor wire bar of #3, and the coated film was placed in a 120° C. air circulation oven for 60 seconds to undergo thermal curing. The thus cured coating was examined for releasability and slippability in the same ways as in Example 1. Further, the same cured coating was formed in the same manner as described above, except that the thickness of the polyester film used was changed to 50 μm, and examined for curability in the same way as in Example 1. The evaluation results obtained are shown in Table 1.

TABLE 1

| | Organopoly-siloxane | Curability | Slippability SBR | Slippability touch | Releasability (g/5 cm) |
|---|---|---|---|---|---|
| Example 1 | A | ◎ | 0.56 | ◎ | 32 |
| Example 2 | B | ◎ | 0.59 | ◎ | 28 |
| Example 3 | C | ◎ | 0.42 | ○ | 45 |
| Polyester film | — | — | 0.95 | XX | 650 |

What is claimed is:
1. A curable silicone composition comprising:
   (a) 100 parts by weight of an organopolysiloxane represented by the following formula (I);

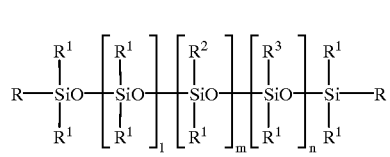

wherein $R^1$ is a monovalent saturated hydrocarbon group; $R^2$ is a phenyl-substituted alkyl group represented by $C_6H_5\text{---}(CH_2)_p\text{---}CH(R^4)\text{---}CH_2\text{---}$; $R^3$ is a hydroxyl-substituted alkyl group represented by $\text{---}CH_2\text{---}CH_2\text{---}CH_2\text{---}O\text{---}(C_2H_4O)_q\text{---}H$; two R groups are the same group or different groups selected from the groups represented by $R^1$, $R^2$ or $R^3$; $R^4$ is a hydrogen atom or the same group as $R^1$; l is 0 or a positive number, m is a positive number and n is a positive number of no less than 2, provided that $0.10 \leq m/(l+m+n) \leq 0.70$ and $5 \leq l+m+n \leq 100$; p is an integer of from 0 to 5; and q is an integer of from 1 to 3, and
   (b) 1–50 parts by weight of an isocyanate compound having at least two isocyanate groups per molecule;
   wherein the number of the hydroxyl groups per molecule in said component (a) plus the number of the isocyanate groups per molecule in said component (b) is at least 5.

2. A curable silicone composition according to claim 1, wherein the proportion of $R^2$ to the total organic groups in the organopolysiloxane of formula (I) is from 5 to 30 mole %.

3. A curable silicone composition according to claim 1, wherein $R^1$ is a methyl group.

4. A curable silicone composition according to claim 1, wherein l+m+n is from 10 to 50.

5. A curable silicone composition according to claim 1, wherein said isocyanate compound is a diisocyanate or triisocyanate selected from the group consisting of diphenylmethane diisocyanate, tolylene diisocyanate, hexamethylenediisocyanate, xylylene diisocyanate and triphenylmethane triisocyanate.

6. A curable silicone composition according to claim 1, which is incorporated with an organic polymer.

7. A curable silicone composition according to claim 6, wherein the organic polymer is a polymer selected from the group consisting of polyester, polyurethane, polyvinyl chloride and alkyd resin.

8. The composition of claim 1, wherein in formula (I), $R^1$ is methyl or ethyl.

9. The composition of claim 1, which further comprises an amine or organotin compound as a catalyst.

* * * * *